United States Patent [19]

Dixon

[11] 4,171,417
[45] Oct. 16, 1979

[54] POLYMERS WITH IMPROVED SOLVENT HOLDOUT IN ELECTROCONDUCTIVE PAPER

[75] Inventor: Kenneth W. Dixon, Sewickley, Pa.

[73] Assignee: Calgon Corporation, Pittsburgh, Pa.

[21] Appl. No.: 956,302

[22] Filed: Oct. 30, 1978

[51] Int. Cl.$^2$ .......................................... C08F 220/22
[52] U.S. Cl. ................................. 526/245; 162/138; 162/168 N; 260/42.49; 428/514
[58] Field of Search ...................... 526/245, 310, 295

[56] References Cited

U.S. PATENT DOCUMENTS

| | | | |
|---|---|---|---|
| Re. 28,543 | 9/1975 | Boothe et al. | 428/514 |
| 2,923,701 | 2/1960 | Schuller et al. | 260/85.5 |
| 3,544,318 | 12/1970 | Boothe et al. | 526/310 |
| 3,562,226 | 2/1971 | Gayley et al. | 526/295 |
| 3,953,374 | 4/1976 | Windhager | 252/518 |
| 4,127,711 | 11/1978 | Lore et al. | 526/245 |

Primary Examiner—Harry Wong, Jr.
Attorney, Agent, or Firm—Mario A. Monaco; Martin L. Katz; Raymond M. Speer

[57] ABSTRACT

Copolymers useful in making electroconductive paper which impart improved solvent holdout properties to the electroconductive paper, comprising monomer units of quaternary diallyldialkylammonium and a monomer of the formula: $-CH_2=C(R_1)-C(O)-O-R_2$, where $R_1$ is hydrogen or methyl; $R_2$ is an alkyl group of 2 to 12 carbon atoms, that number being designated n, substituted with fluorine atoms in number equal to from n to 2n; and for the quaternary diallyldialkylammonium monomer, the alkyl groups are independently selected from alkyl groups of one to 18 carbon atoms, and the counterion is an anion.

3 Claims, No Drawings

POLYMERS WITH IMPROVED SOLVENT HOLDOUT IN ELECTROCONDUCTIVE PAPER

BACKGROUND OF THE INVENTION

1. Field of the Invention

The present invention is concerned with particular copolymers useful in making the electroconductive layer for electroconductive paper useful in electrostatic image reproduction techniques. The copolymers also impart improved solvent holdout properties to the electroconductive paper.

The present invention is also concerned with improved electroconductive coating color formulations for electroconductive paper which employ certain copolymers that impart enhanced solvent holdout properties to the electroconductive paper.

2. Brief Description of the Prior Art

Preparation of electroconductive paper including a layer of poly(diallyldimethylammonium chloride) and various copolymers thereof is described in U.S. Pat. No. Re. 28,543. The use of small amounts of polyethylenic unsaturated compounds during polymerization in order to achieve a highly branched and/or cross-linked final polymer which will impart superior solvent holdout properties to the electroconductive paper is also described.

One-pass electroconductive coating color formulations having improved solvent holdout properties obtained by addition thereto of an effective amount of a perfluoroalkyl phosphate salt are described in U.S. Pat. No. 3,953,374.

However, none of the electroconductive coating color formulations having improved solvent holdout, or the polymers or copolymers employed therein, described in the prior art referred to above, in any way suggest the copolymers and improved electroconductive coating color formulations of the present invention.

SUMMARY OF THE INVENTION:

The copolymers of the present invention useful for preparing electroconductive paper with improved solvent holdout comprise monomer units of quaternary diallyldialkylammonium and a monomer of the following formula:

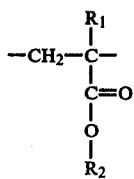

wherein
R$_1$ is hydrogen or methyl; and
R$_2$ is an alkyl group of 2 to 12 carbon atoms, that number being designated n, preferably C$_{2-6}$ alkyl, substituted with fluorine atoms in number equal to from n to 2n.

For the quaternary diallyldialkylammonium monomer, the alkyl groups are independently selected from alkyl groups of one to 18 carbon atoms, preferably C$_{1-4}$ alkyl. The counterion for the quaternary monomer is an anion, preferably fluoride, chloride, bromide, hydroxide, nitrate, acetate, hydrogensulfate, and primary phosphate.

The quaternary diallyldialkylammonium monomer will comprise from 70 to 99.5 weight percent of the final polymer, while the monomer of Formula I will comprise from 0.5 to 30 weight percent of the final polymer.

Thus, in the copolymers of the present invention the cationic portion of the polymer is predominant, while the fluoroalkyl acrylate portion of the polymer, which plays an essential role in establishing the improved solvent holdout imparting properties in the final polymer, is present in minor portions.

An especially suitable copolymer of the present invention is that where the cationic portion is 98 weight percent and is diallyldimethylammonium chloride (DMDAAC), and the fluoro acrylate portion is 2 weight percent and is octafluoropentyl methacrylate (OFPM). The octafluoropentyl methacrylate portion of the copolymer may be represented as follows:

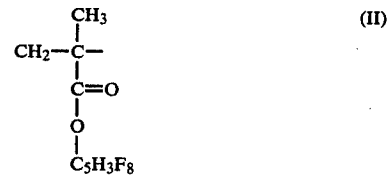

It is also contemplated that the copolymers of the present invention may include, additionally, a third comonomer unit of the following formula:

where R$_3$ is hydrogen, halogen, C$_{1-4}$ alkyl, or may be the same as R$_4$, and R$_4$ is selected from aryl and alkaryl radicals represented by the formulas:

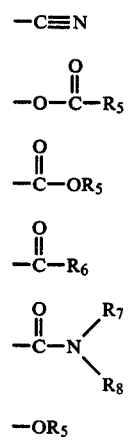

where R$_5$ represents a radical selected from C$_{1-8}$ alkyl, cyclo C$_{3-6}$ alkyl, and C$_{1-8}$ alkoxy C$_{1-4}$ alkyl radicals; R$_6$ has the same meaning as R$_5$ and, in addition, an aryl radical; and R$_7$ and R$_8$ each represents a member independently selected from hydrogen, C$_{1-8}$ alkyl, cyclo C$_{3-6}$ alkyl, aryl, C$_{1-8}$ alkaryl, aryl C$_{1-4}$ alkyl, C$_{1-8}$ alkoxy C$_{1-4}$ alkyl, and methylol.

See Schuller and Thomas U.S. Pat. No. 2,923,701 for a description of the mechanism of copolymerization of such monomers with the quaternary diallyldialkylammonium monomers described above.

The third comonomer units described above may be included with the copolymers of the present invention to the extent of from 0 to 20 weight percent. Thus, the resulting terpolymers comprise monomer units of quaternary diallydialkylammonium and monomer units of the following formulas:

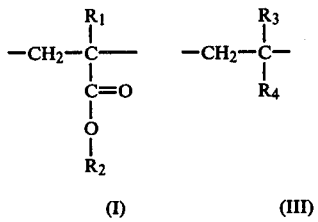

(I)       (III)

where $R_1$ through $R_4$ have the same meaning as above. The quaternary diallyldialkylammonium monomer will comprise from 70 to 99.5 weight percent of the final polymer; the monomer of Formula I will comprise from 0.5 to 10 weight percent of the final formula; and the monomer of Formula III will comprise from 1 to 20 weight percent of the final polymer.

The copolymers of the present invention described above are used to prepare electroconductive paper. Electroconductive paper may be used to distribute electrical stresses in various insulating products; see U.S. Pat. No. 3,148,107. Where electrically conductive paper is to be used for nonimpact printing, a substrate, backing, impregnation coating, or layer of electrically conductive material is usually constructed. See Vaurio and Fird, "Electrically Conductive Paper for nonimpact printing," TAPPI, December 1964, vol. 47, No. 12, pp. 163A–165A. Various types of nonimpact printing processes are known, such as electrostatographic, electrophotographic, electrographic, Electrofax® and other processes. The copolymers of the present invention are also useful in preparing electroconductive papers used in dielectric processes. See U.S. Pat. Nos. 3,709,728 and 3,779,982. As a rule such processes call for the placement of an electric charge on the paper, which may be accomplished by a corona discharge in copies, or by charged stylii in pulsed printers and plotters. The charge is, in some processes, placed on the paper in darkness. The paper also contains an insulating or dielectric layer or material which causes the charge to be dissipated in an area where light strikes it, thus leaving a pattern of the charged areas which is a reproduction of the image desired. The charged area attracts a powdered or other usually particulated image-forming material which may be fused or otherwise treated to make the image permanent. Other dielectric processes differ in that the image is created by electrical dissipation of the static charge in nonimage areas; in this and other processes (see Vaurio and Fird, supra), the common characteristic is an electrically conductive base paper.

Probably the most common system at present is the direct electrostatic process; see "Chemical & Engineering News," July 20, 1964, pp. 88–89; U.S. Pat. No. 3,052,539. This process is similar to the xerographic method of copy reproduction; however, the conductive substrate is built into the paper rather than being on a separate drum or other device.

Among the desirable characteristics of an electrically conductive material for use in nonimpact printing are whiteness and stability of conductivity over a wide range of relative humidity. Various inorganic additives have been rejected or criticized by workers in the art because of their excessive weight and/or objectionable color as well as their poor tolerance of humidity variations.

In addition to their utility in forming the basis for the electroconductive layer of electroconductive paper, the copolymers of the present invention also have the important utility of being able to impart improved solvent holdout properties to the electroconductive paper to which they have been applied. Thus, the copolymers of the present invention are useful in preparing electroconductive coating color formulations with improved solvent holdout imparting properties. Particularly, such formulations may be applied to non-surface sized paper raw stock and the resultant coated paper will have solvent holdout and conductivity that are acceptable for conductive base stocks used in electroconductive paper grades.

In general, electroconductive base sheets for use in the manufacture of electrographic reproduction papers are prepared by applying to one or both surfaces of a suitable paper substrate (a publication grade paper of basis weight in the range of 30 to 45 pounds per 3,000 square feet) a resinous conductive layer to render the paper electroconductive. Commonly the conductive layer comprises an electroconductive polymer either alone or more usually, formulated with a binder (normally a water dispersible, non-conductive film-forming polymer such as a protein, starch, styrene-butadiene latices, a modified or converted starch, casein, polyvinyl acetate, polyvinyl alcohol, and the like), and with a pigment (such as calcium carbonate, kaolin clay, titanium dioxide, alumina or a combination of these materials). In the electrographic reproduction paper industry, such formulations including a conductive agent, a binder and a pigment, are commonly referred to as coating color formulations or compositions.

The binders in conventional conductive coating color formulations serve to make the paper less porous and more uniform, to improve the adherence of the conductive layer to the base paper and, importantly, to impart to the conductive layer the properties of a holdout or barrier coating to prevent solvents employed in the later applied dielectric or photosensitive layers from penetrating into the conductivized paper. A separate non-conductive solvent holdout layer comprising one or a mixture of conventional binders is usually applied to the paper prior to the application of the conductive layer in order to assist in achieving a solvent holdout effect. Solvent holdout to both toluene and paraffinic solvents is essential because the top side of a conductive base paper comes into contact with toluene during the subsequent application of the dielectric or photosensitive coating which comprises dye-sensitized zinc oxide or dielectric resin dispersed in a solution of toluene and a binder. The back side of the coated base stock (now referred to as finished electrographic paper) comes into contact with kerosene during the copying process, i.e., in Electrofax® copy machines that use "wet" toners which are comprised of carbon particles suspended in a solution of kerosene and binders. The usual type of electroconductive polymer in combination with the usual type of coating color additives, such as the binders and pigments mentioned above, will not give acceptable solvent holdout when applied at commercially feasable coatweights of from 1 to 4 pounds of coating per 3,000 square feet of paper surface where attempts are made to prepare the conductive base sheet in an obviously desirable one-pass process, that is, without pretreatment of the paper raw stock with a separate solvent holdout layer.

The copolymers of the present invention are intended for use in electroconductive coating color formulations used in multi-pass coating operations. However, it is contemplated that the copolymers of the present invention may also be used to prepare coating color formulations usable in one-pass coating operations.

Use of the copolymers of the present invention thus results in improved electroconductive coating color formulations giving conductive base sheet surface resistivity, and enhanced solvent holdout properties that are commercially acceptable for the manufacture of electrographic reproduction papers according to current industry standards and practices, when applied to a surface sized raw stock (a raw stock that has received a surface treatment of starch, alginate or other surface sizing material). It is also contemplated that the copolymers of the present invention may be used to prepare coating color formulations giving acceptable electroconductive paper when applied to non-surface sized raw stock, as well. The improved coating color formulations of this invention, therefore, not only provide enhanced solvent holdout properties, but may make possible the application of the electroconductive layer to the base sheet in a one-pass operation, thus eliminating any necessity for the application of separate solvent holdout layers. The surface resistivity, and solvent holdout properties obtained through the use of the improved coating color formulations of this invention have been confirmed employing standard laboratory techniques. It is contemplated, therefore, that suitable coatweights of the improved coating color formulations of this invention will be employed in the manufacture of electroconductive base sheets suitable for the preparation of electrophotographic, electrographic, and similar reproduction process papers.

The binders employed in the improved coating color formulations of this invention can be of great variety and do not constitute a critical aspect of the instant invention. Any of the water dispersible, non-conductive, film-forming polymers conventionally employed for this purpose may be used in the coating color formulations of this invention. Suitable binders will include, for example, polyvinyl alcohols, polyvinyl acetates, styrene-butadiene latices, poly(ethylene-vinyl acetate)-copolymers, unmodified starches, acetylated starches, hydroxyethyl starches, enzyme converted starches, oxidized starches, proteins, caseins, and the like or mixtures thereof. Similarly, any of the variety of pigments conventionally employed in coating color formulations may be employed in the improved color coating formulations of this invention including commercially available calcium carbonates, kaolin clays, titanium dioxides, aluminas or combinations of these materials.

The weight percent (dry coating basis) of the several components in the improved coating color formulations of the present invention may vary widely. In general, the electroconductive polymer component will constitute from 15 to 50% by weight of the formulation; the binder will constitute from 30 to 70% by weight of the formulation, and the pigment will constitute from 10 to 60% by weight of the formulation. Such formulations are typical of the coating color formulations usually employed in the manufacture of electroconductive base sheets.

EXAMPLE 1

To a 1 liter flask were added 392.6 g of a 67.4% aqueous solution of diallyldimethylammonium chloride, 174.3 g of deionized water, 0.3 g of the tetrasodium salt of ethylenediaminetetraacetic acid and 2.0 g of glycerin. The pH was adjusted to 7.1 with dilute sulfuric acid, and the solution was purged with nitrogen for 1 hour while heating to 100° C. Solutions of 2.7 g of ammonium persulfate in 10.0 g of water and 2.45 g of sodium carbonate in 10.25 g of water were added over 3 hours. Simultaneously, 5.4 g of octafluoropentyl methacrylate (from Polysciences, Inc., Warrington, Pa. 18976) was added at the following rates. For the first 35 minutes, the rate was 4.3 ml/hr., then 2.2 ml/hr. for 32 minutes, then 1.0 ml/hr. for 41 minutes and finally 0.24 ml/hr. for 63 minutes. After all the feeds were complete, the solution was held at reflux for one hour, then cooled and 75 ml of water was added. The hazy yellow solution had a Brookfield viscosity of 2645 cps.

EXAMPLE 2

To a 1 liter flask were added 340.5 g of a 67.4% aqueous solution of diallyldimethylammonium chloride, 136.5 g of deionized water, 0.3 g of the tetrasodium salt of ethylenediaminetetraacetic acid and 20.0 g of glycerin. The pH was adjusted to 7.1 with dilute sulfuric acid and the solution was purged with nitrogen for one hour while heating to 100° C. Solutions of 2.7 g of ammonium persulfate in 10.0 g of water and 2.45 g of sodium carbonate in 10.25 g of water were added over 3 hours. Simultaneously, 71.9 g of a 48.4% aqueous acrylamide solution and 5.4 g of octafluoropentyl methacrylate (OFPMA) were separately added at the following rates.

| Acrylamide | | OFPMA | |
|---|---|---|---|
| Rate (ml/min.) | Time (min.) | Rate (ml/min.) | Time (min.) |
| 1.27 | 29 | 0.092 | 28 |
| 0.55 | 31 | 0.040 | 29 |
| 0.35 | 29 | 0.020 | 35 |
| 0.067 | 51 | 0.0045 | 51 |

After all the feeds were complete, the solution was held at reflux for one hour, then cooled and 75 ml. of water was added. The yellow solution had a Brookfield viscosity of 2540 cps.

EXAMPLE 3

I. Solvent Holdout Test:

The coated sheets were tested for solvent penetration using a ten-second contact time. One-half milliliter of a dyed toluene solution is applied to the coat surface. After 10 seconds, the excess dye is wiped off and the degree of dye penetration on the reverse side is determined by comparison to the TAPPI standard chart.

II. Conductivity Measurements

Coated sheets were cut into 3.375 inch diameter circles and conditioned overnight at 20% relative humidity. Surface resistivity was measured using a circular electrode and a Keithley electrometer at 100 V applied voltage.

The results of the above evaluations are set out in the following table of values:

I. Starch formulation: 50% clay, 30% conductive polymer, 20% hydroxyethylated starch. (EG-3030)[3]

RAW STOCK No. 1

| Conductive Polymer | Coatweight (lb./3000 ft.[2]) | % Solvent Penetration | Surface Resistivity at 20% RH (ohms, square) |
|---|---|---|---|
| 98/2 DMDAAC/ octafluoropentyl methacrylate | 1.4 | 40 | $8.8 \times 10^8$ |
|  | 2.4 | 15 | $3.6 \times 10^8$ |
| Control (LV-261)[1] | 1.6 | 70 | $4.9 \times 10^8$ |
|  | 2.0 | 50 | $3.1 \times 10^8$ |

II. Starch/latex formulation: 45% clay, 30% conductive polymer, 15% Airflex 110[2] STOCK 10% hydroxyethylated starch (EG-3030)[3].

RAW STOCK 2

| Conductive Polymer | Coatweight (lb./3000 ft.[2]) | % Solvent Penetration | Surface Resisitivity at 20% RH (ohms, square) |
|---|---|---|---|
| 98/2 DMDAAC/ octofluoropentyl methacrylate | 1.9 | 15 | $1.3 \times 10^9$ |
|  | 2.4 | 10 | $7.3 \times 10^8$ |
| Control (LV-261)[1] | 1.4 | 25 | $1.2 \times 10^9$ |
|  | 2.4 | 15 | $6.3 \times 10^8$ |

III. Starch/latex formulation: 40% clay, 30% conductive polymer 10% Airflex 110[2] 20% hydroxyethyldated starch (EG-3030)[3]

RAW STOCK NO. 2

| Conductive Polymer | Coatweight (lb./3000 ft.[2]) | % Solvent Penetration | Surface Resistivity at 20% RH (ohms, square) |
|---|---|---|---|
| 98/2 DMDAAC/ octafluoropentyl methacrylate | 2.6 | 40 | $3.3 \times 10^8$ |
|  | 3.3 | 20 | $3.0 \times 10^8$ |
| Control (LV-261)[1] | 2.6 | 50 | $3.6 \times 10^8$ |
|  | 3.7 | 25 | $3.0 \times 10^8$ |

IV. Starch formulation: 50% clay, 30% conductive polymer, 20% hydroxyethylated starch (EG-3030)[3]

RAW STOCK NO. 3

| Conductive Polymer | Coatweight (lb./3000 ft.[2]) | % Solvent Penetration | Surface Resistivity at 20% RH (ohms, square) |
|---|---|---|---|
| 85/13/2 DMDAAC/ acrylamide/ octafluoropentyl methacrylate | 1.6 | 15 | $6.5 \times 10^9$ |
|  | 2.4 | 8 | $4.9 \times 10^9$ |
| Control (LV-261)[1] | 1.7 | 80 | $8.0 \times 10^8$ |
|  | 2.4 | 40 | $4.9 \times 10^8$ |

[1]LV-261 - poly(diallydimethylammonium chloride) 1,000–3,000 centipoise at 40% solids, 25° C.
[2]Airflex 110 - ethylene and vinyl acetate copolymer
[3]EG-3030 - low viscosity hydroxyethylated starch

What is claimed is:

1. A copolymer comprising monomer units of quaternary diallyldialkyl ammonium and a monomer of the formula:

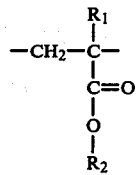

wherein, $R_1$ is hydrogen or methyl;

$R_2$ is an alkyl group of 2 to 12 carbon atoms, that number being designated n, substituted with fluorine atoms in number equal to from n to 2n; and for the quaternary diallyldialkylammonium monomer, the alkyl groups are independently selected from alkyl groups of one to 18 carbon atoms and the counterion is an anion; and the quaternary diallyldialkylammonium monomer comprises from 70 to 99.5 weight percent of the final polymer, while the monomer of the above formula comprises from 0.5 to 30 weight percent of the final polymer.

2. The copolymer of claim 1 comprised of units of diallyldimethylammonium chloride and octafluoropentyl methacrylate.

3. A terpolymer comprising monomer units of quaternary diallyldialkylammonium and monomers of the formulas:

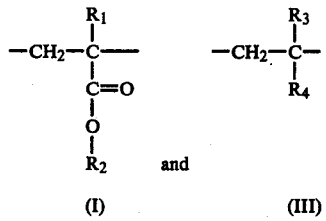

(I) and (III)

wherein $R_1$ is hydrogen or methyl; and $R_2$ is an alkyl group of 2 to 12 carbon atoms, that number being designated n, substituted with fluorine atoms in number equal to from n to 2n;

$R_3$ is hydrogen, halogen, $C_{1-4}$ alkyl, or the same as $R_4$;

$R_4$ is selected from aryl and alkaryl radicals represented by the formulas

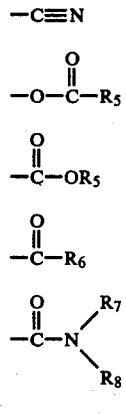

where $R_5$ represents a radical selected from $C_{1-8}$ alkyl, cyclo $C_{3-6}$ alkyl, and $C_{1-8}$ alkoxy $C_{1-4}$ alkyl radicals; $R_6$ has the same meaning as $R_5$ and, in addition, an aryl radical; and $R_7$ and $R_8$ each represents a member independently selected from hydrogen, $C_{1-8}$ alkyl, cyclo $C_{3-6}$ alkyl, aryl, $C_{1-8}$ alkaryl, aryl $C_{1-4}$ alkyl, $C_{1-8}$ alkoxy $C_{1-4}$ alkyl, and methylol; and the quaternary diallyldialkylammonium monomer comprises from 70 to 99.5 weight percent of the final polymer; the monomer of Formula I comprises from 0.5 to 10 weight percent of the final polymer; and the monomer of Formula III comprises from 1 to 20 weight percent of the final polymer.

* * * * *